United States Patent
Berger et al.

(10) Patent No.: US 8,447,932 B2
(45) Date of Patent: May 21, 2013

(54) RECOVER STORE DATA MERGING

(75) Inventors: Deanna P. Berger, Poughkeepsie, NY (US); Michael F. Fee, Cold Spring, NY (US); Christine C. Jones, Poughkeepsie, NY (US); Diana L. Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/820,511

(22) Filed: Jun. 22, 2010

(65) Prior Publication Data

US 2011/0314211 A1 Dec. 22, 2011

(51) Int. Cl.
*G06F 12/12* (2006.01)

(52) U.S. Cl.
USPC .......................................... 711/133; 711/118

(58) Field of Classification Search
None
See application file for complete search history.

(56) References Cited

U.S. PATENT DOCUMENTS

| 5,623,628 | A | * | 4/1997 | Brayton et al. | 711/141 |
| 6,295,579 | B1 | * | 9/2001 | Sukegawa et al. | 711/119 |
| 7,319,702 | B2 | | 1/2008 | Moll et al. | |
| 2002/0178324 | A1 | * | 11/2002 | Barth et al. | 711/106 |
| 2007/0067567 | A1 | * | 3/2007 | Jiao et al. | 711/118 |
| 2010/0250850 | A1 | * | 9/2010 | Yang et al. | 711/118 |

* cited by examiner

*Primary Examiner* — Than Nguyen
(74) *Attorney, Agent, or Firm* — Fleit Gibbons Gutman Bongini & Bianco PL; Thomas Grzesik

(57) ABSTRACT

Various embodiments of the present invention merge data in a cache memory. In one embodiment a set of store data is received from a processing core. A store merge command and a merge mask from are also received from the processing core. A portion of the store data to perform a merging operation thereon is identified based on the store merge command. A sub-portion of the portion of the store data to be merged with a corresponding set of data from a cache memory is identified based on the merge mask. The sub-portion is merged with the corresponding set of data from the cache memory.

20 Claims, 7 Drawing Sheets

RECOVER STORE DATA MERGING

FIELD OF THE INVENTION

The present invention generally relates to microprocessors, and more particularly relates to high performance caches.

BACKGROUND OF THE INVENTION

The L3 cache is a store in cache whose finest granularity for stores is 8 bytes (i.e., 1 doubleword). Therefore, to store amounts of data less than 1 doubleword, the lower level caches are generally required to merge the data to be updated with data from the lower level cache. The full doubleword is then sent to be stored in the L3 cache. However, to improve store performance, the lower level caches may not check the background data for errors before merging the data. This is problematic since merging updated data with corrupted background data results in data with uncorrectable errors being sent to the L3 cache.

SUMMARY OF THE INVENTION

In one embodiment, a method for merging data in a cache memory is disclosed. The method comprises receiving a set of store data from a processing core. A store merge command and a merge mask from are also received from the processing core. A portion of the store data to perform a merging operation thereon is identified based on the store merge command. A sub-portion of the portion of the store data to be merged with a corresponding set of data from a cache memory is identified based on the merge mask. The sub-portion is merged with the corresponding set of data from the cache memory.

In another embodiment, an information processing device for merging data in a cache memory is disclosed. The information processing device comprises a plurality of processing cores and at least one memory cache that is communicatively coupled to the plurality of processing cores. At least one cache controller is communicatively coupled to the at least one memory cache and the plurality of processing cores. The at least one cache controller is configured to perform a method. The method comprises receiving a set of store data from a processing core. A store merge command and a merge mask from are also received from the processing core. A portion of the store data to perform a merging operation thereon is identified based on the store merge command. A sub-portion of the portion of the store data to be merged with a corresponding set of data from a cache memory is identified based on the merge mask. The sub-portion is merged with the corresponding set of data from the cache memory.

In yet another embodiment, a tangible computer program product for merging data in a cache memory is disclosed. The tangible computer program product comprises a storage medium readable by a processing circuit and storing instructions for execution by the processing circuit for performing a method. The method comprises receiving a set of store data from a processing core. A store merge command and a merge mask from are also received from the processing core. A portion of the store data to perform a merging operation thereon is identified based on the store merge command. A sub-portion of the portion of the store data to be merged with a corresponding set of data from a cache memory is identified based on the merge mask. The sub-portion is merged with the corresponding set of data from the cache memory.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
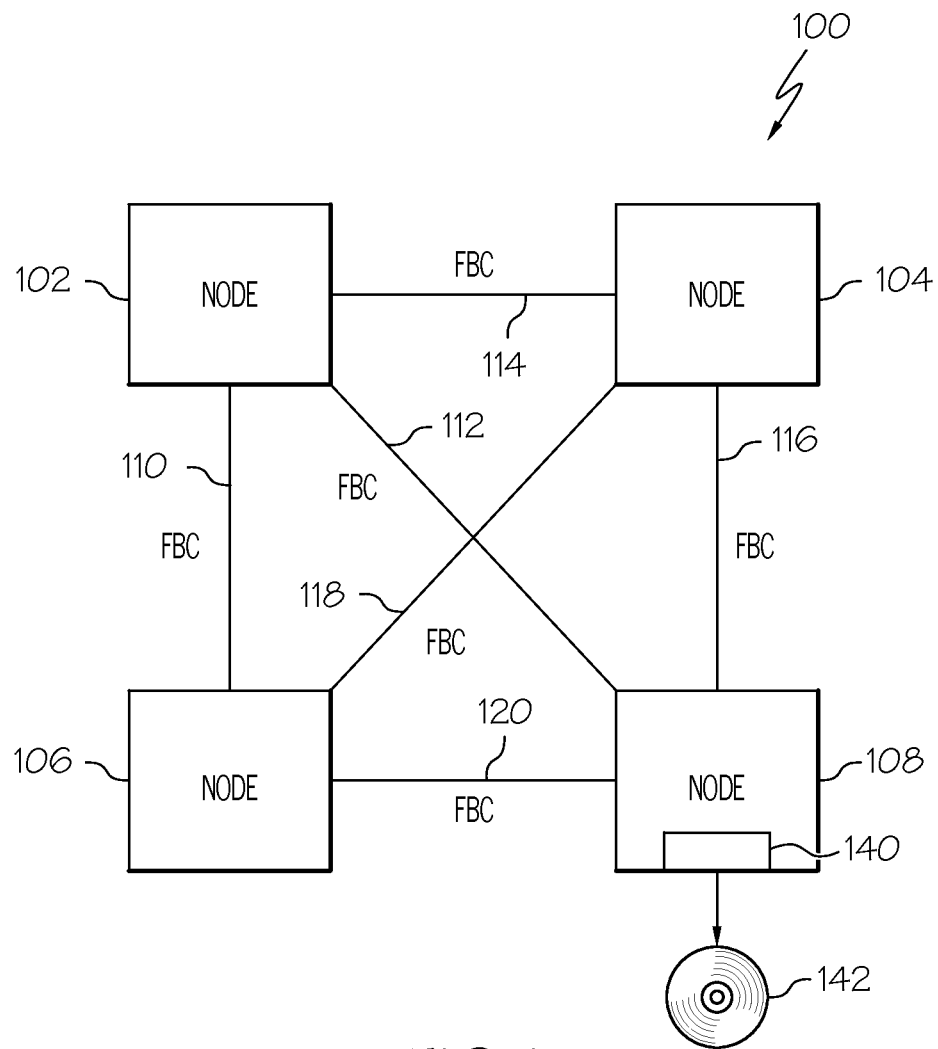
FIG. 1 is a block diagram illustrating one example of a computing system according to one embodiment of the present invention.
Figure 2:
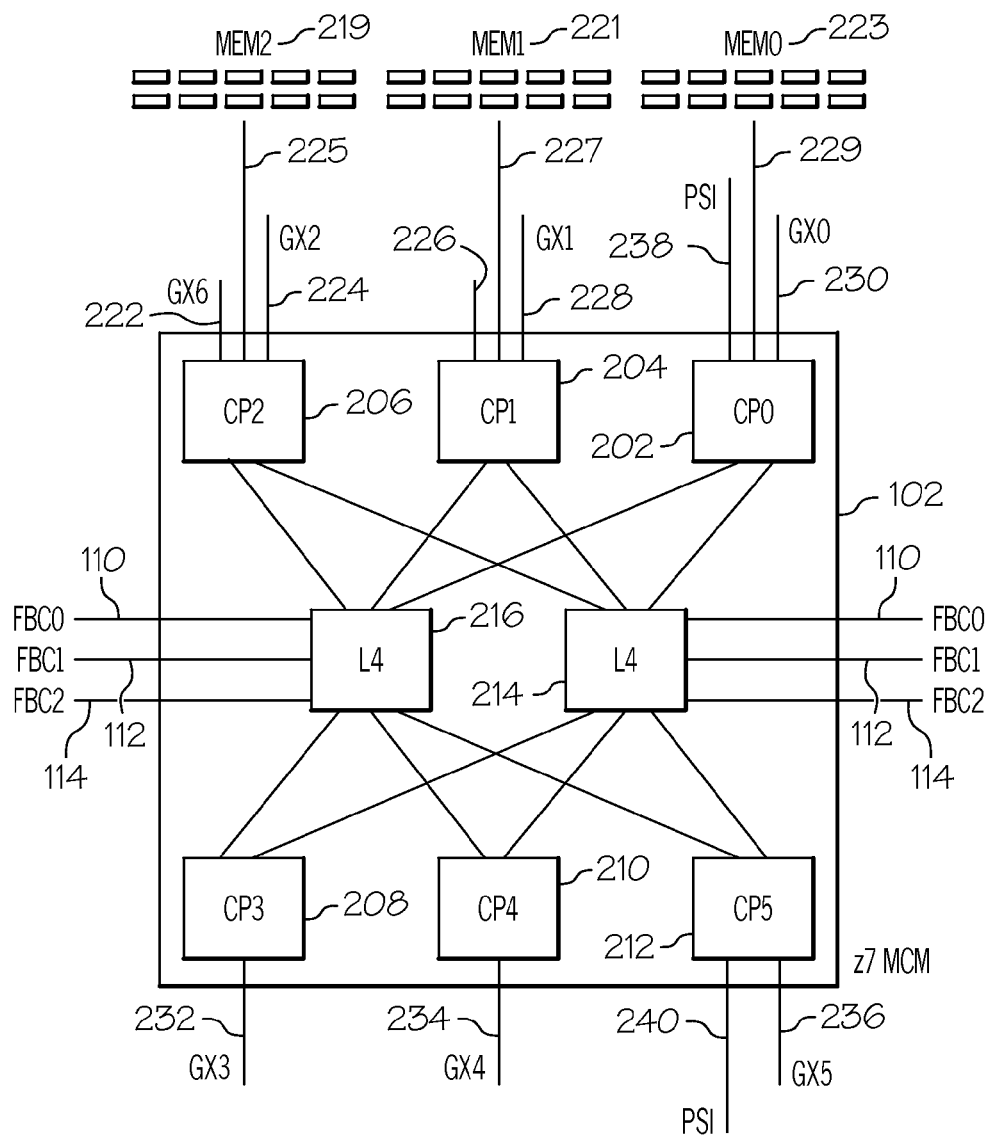
FIG. 2 is a block diagram illustrating one example of a computing node within the computing system of FIG. 1 according to one embodiment of the present invention.
Figure 3:
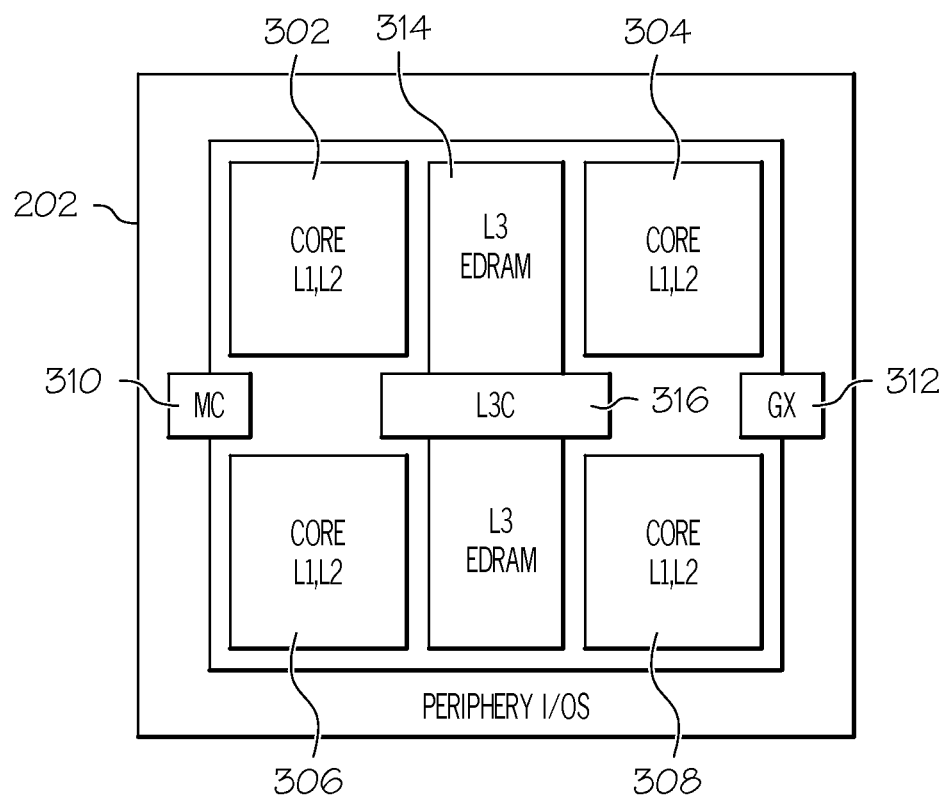
FIG. 3 is a block diagram illustrating one example of a processing chip within the node of FIG. 1 according to one embodiment of the present invention.

FIGS. 1-3 show one example of an operating environment applicable to various embodiments of the present invention. In particular, FIG. 1 shows a computing system 100 that comprises a plurality of computing nodes 102, 104, 106, 108. Each of these computing nodes 102, 104, 106, 108 are communicatively coupled to each other via one or more communication fabrics 110, 112, 114, 116, 118, 120. Communication fabric includes wired, fiber optic, and wireless communication connected by one or more switching devices and port for redirecting data between computing nodes. Shown on node 108 is a storage medium interface 140 along with a computer readable store medium 142 as will be discussed in more detail below. Each node, in one embodiment, comprises a plurality of processors 202, 204, 206, 208, 210, 212, as shown in FIG. 2. Each of the processors 202, 204, 206, 208, 210, 212 is communicatively coupled to one or more higher level caches 214, 216 such as an L4 cache. Each higher level cache 214, 216 is communicatively coupled to the communication fabrics 110, 112, 114 associated with that node as shown in FIG. 1. It should be noted that even though two higher level caches 214, 216 are shown these two lower level caches 214, 216, in one embodiment, are logically a single cache.

A set of the processors 202, 204, 206 are communicatively coupled to one or more physical memories 219, 221, 223 via a memory port 225, 227, and 229. Each processor 204, 206, 208, 210, 212 comprises one or more input/output ports 222, 224, 226, 228, 230, 232, 234, 236. One or more of the processers 202, 212 also comprise service code ports 238, 240 Each processor 204, 206, 208, 210, 212, in one embodiment, also comprises a plurality of processing cores 302, 304, 308 with higher level caches such as L1 and L2 caches, as shown in FIG. 3. A memory controller 310 in a processor 202 communicates with the memory ports 225, 227, 229 to obtain data from the physical memories 219, 221, 223. An I/O controller 312 controls sending and receiving on the I/O ports 222, 224, 226, 228, 230, 232, 234, and 236. A processor 202 on a node 102 also comprises at least one L3 EDRAM cache 314 that is controlled by a cache controller 316. In one embodiment, the L3 EDRAM cache 314 and the L4 cache 214, 216 are shared by all processing cores in the system 100.

The L3 EDRAM cache 314, in one embodiment, is a hierarchical store-through cache structure. Cache accesses are executed under the control of a processing pipe. The pipe is a sequence of processing steps, one per clock cycle, strung together one after another. In each step, in the following called cycle, certain operations are performed e.g. writing data into the cache memory (store) or reading data from the cache memory (fetch).

Recovery Store Data Merging

As discussed above, conventional merging operations generally do not check the background data for errors before merging the data. This is problematic since merging updated data with corrupted background data results in data with uncorrectable errors being sent to the L3 cache 314. Uncorrectable error (UE) identifiers can be stored in the L3 cache 314 to identify the errors. However, storing UEs (uncorrectable error identifiers) in the L3 cache 314 is undesirable since it requires extensive recovery actions and can result in a system checkstop. The L3 cache 314 will generally checkstop processing cores that send too many uncorrectable errors to avoid the extensive recovery actions and system checkstop.

Therefore, various embodiments of the present invention modify a merge station generally utilized for I/O data merging to perform recovery store data merging. This allows a processing core to merge small packets of data with good background data in the L3 cache 314 when the background data in the core's cache (e.g., L2 cache) is corrupted, thereby preventing unnecessary core checkstops. In general, when initiating this new merge store, the processing core sends a merge vector in addition to store data to the L3 cache 314. The merge vector indicates whether each portion of data in the L3 cache line should be preserved or overwritten by the store data from the core. Merging the data from the processing core with the good background data in the L3 cache 314 allows the processing core to finish storing out its data and prevents a core checkstop recovery action.

Figure 4:
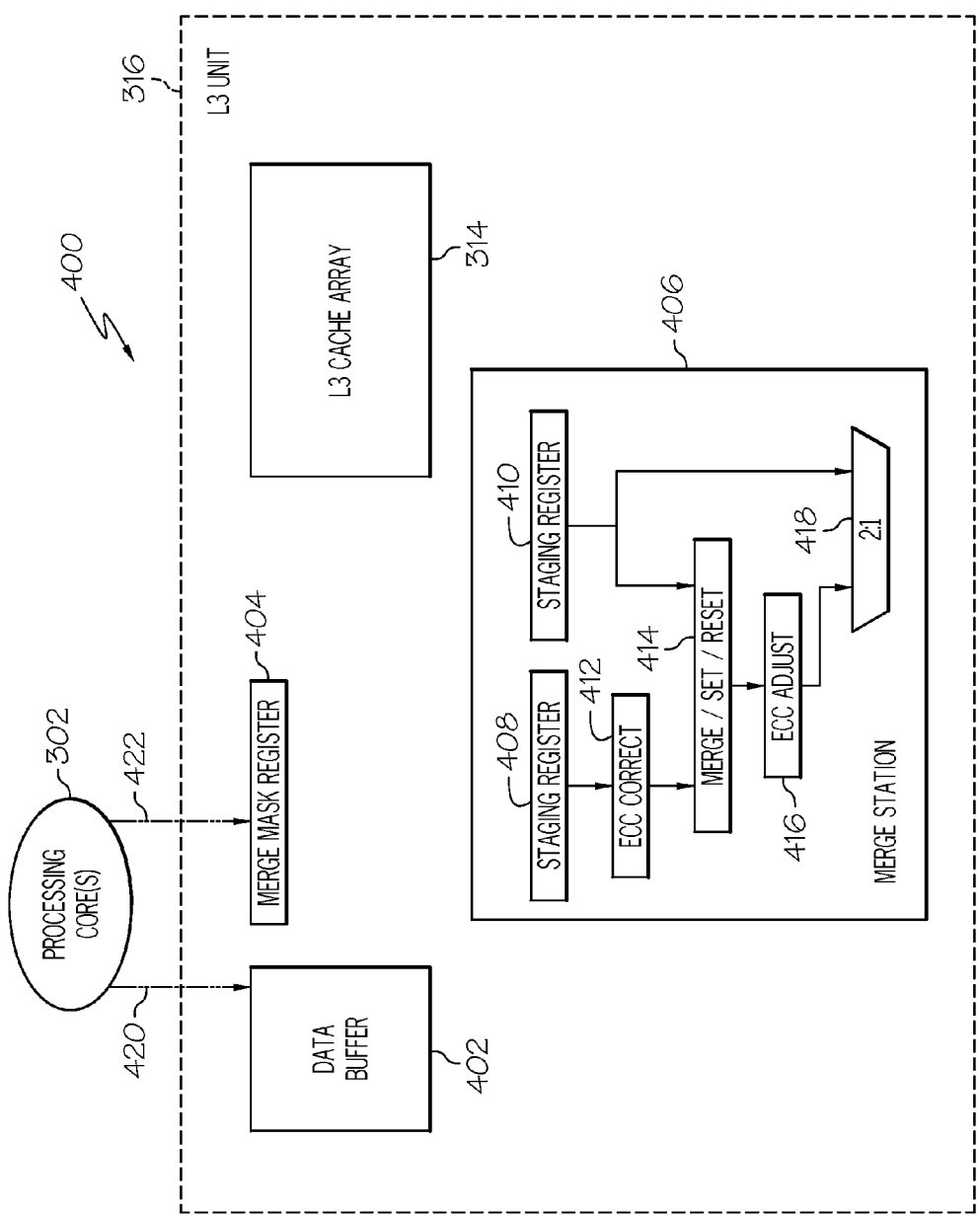
FIGS. 4-6 are a block diagrams illustrating one example a store data merging processing within a cache controller according to one embodiment of the present invention.

A more detailed discussion on the recovery store data merging process briefly discussed above is now given with respect to FIGS. 4-6. FIG. 4 shows an example of a processor subsystem 400 of a processor 202 that is configured for merging data. The subsystem 400 comprises the L3 cache controller 316, a data buffer 402, a merge mask register 404, the L3 cache 314, and a merge station 406. As discussed above, the merge station 406 is a merge station that is generally utilized for I/O data merging and that has been modified according to one or more embodiments of the present invention. This allows space and power to be saved on the processor 202. A more detailed discussion on the merge station for merging I/O data is given in the commonly owned U.S. patent application Ser. No. 12/036,322 and is hereby incorporated by reference in its entirety.

The merge station 406, in one embodiment is communicatively coupled to the data buffer 402, the merge mask register 404, and the L3 cache 314. The merge station 406 comprises a set of staging registers 408, 410. An ECC correcting module 412 is communicatively coupled to the staging registers 408, 410. A merge/set/reset module 414 is communicatively coupled to the ECC correcting module 412 and at least one of the staging resisters 410. An ECC adjusting module 416 is communicatively coupled to the merge/set/reset module 414 and a MUX 418. The MUX 418 is also communicatively coupled to at least one of the staging register 410. The Each processing core 302, 304, 306, 308 is communicatively coupled to the processor subsystem 400. The subsystem 400 receives store data 420, which in one embodiment is 32 bytes) from a processing core 302. This store data is written to the data buffer 402 in 8 byte chunks (or clusters for a total of four 8 byte clusters. The subsystem 400 also receives a store data merge command and a merge mask 422. The merge mask 422 is captured in the merge mask register 404. The store data merge command comprises 4 bits, where each of the 4 bits correspond to one of the 8 bytes clusters in the data buffer 402 for the store data 420. Therefore, the store data merge command indicates which one of the four 8 byte clusters is to be used for merging. Because the store data is 32 bytes and the smallest amount of data that a store operation can target is 1 DW (since the L3 cache subarrays, i.e., interleaves, are 8 bytes each), the subsystem 400 will only merge in one in of the four 8 byte clusters. The merge mask 422, in this embodiment, is 8 bits where each of the 8 bits corresponds to a byte in the 8 bytes indicated by the store merge command. The merge mask 422 indicates which of the bytes in the 8 byte cluster is to be merged with data in the L3 cache 314. In other words, the merge mask 422 specifies which data is good and which data is corrupted within the 8 byte cluster associated with the store merge command.

Figure 5:
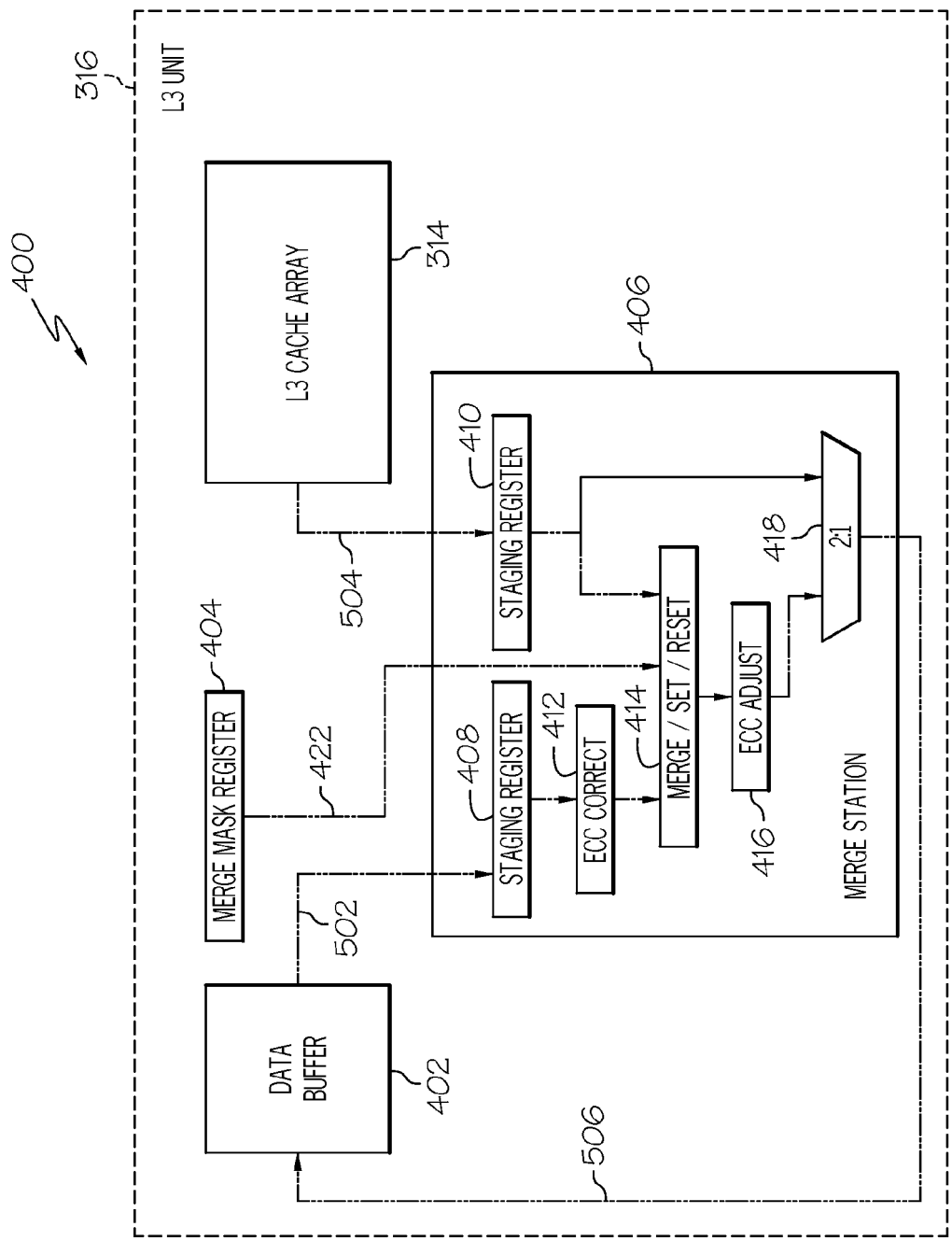

Data 502 (i.e., the 8 byte cluster specified by the storage merge command) from the data buffer 402, the merge mask 422 from the merge mask register 404, and data 504 from the L3 cache 314 are sent to the merge station 406, as shown in FIG. 5. In particular, the data 502 from the data buffer 402 is received by a first staging register 408. The merge mask 422 is received by the merge/set/reset module 414. The cache data 504 is received by the second staging register 410. The data 502 from the data buffer 502 and the cache data 504 are staged for once cycle by the fist staging register 408 and the second staging register 410, respectively.

During the pipe cycle when the merge operation takes place, the new data 502 from the data buffer 402 and the old data 504 (i.e., the old data from the same address in the L3 cache 314 as the new data 502) from the L3 cache 314 are each fed into the merge/set/reset module 414. However, the new data 502 from the data buffer 402 first passes through the ECC module 412 to correct any errors in the data. The L3 cache 314 comprises an internal ECC module (not shown) that performs ECC correction prior to the old data 504 being sent from the L3 cache 314 to the merge station 406. The merge/set/reset module 414 analyzes the merge mask 422 to determine which bytes in the new data 502 to merge with the old data 504 and performs the merging. For example, if the merge mask comprises "01101001" this indicates that bytes 0, 3, 5, and 6 are corrupted so these bytes are overwritten with corresponding cache data 504 while bytes 1, 2, 4, and 7 are good and, therefore, preserved.

Figure 6:
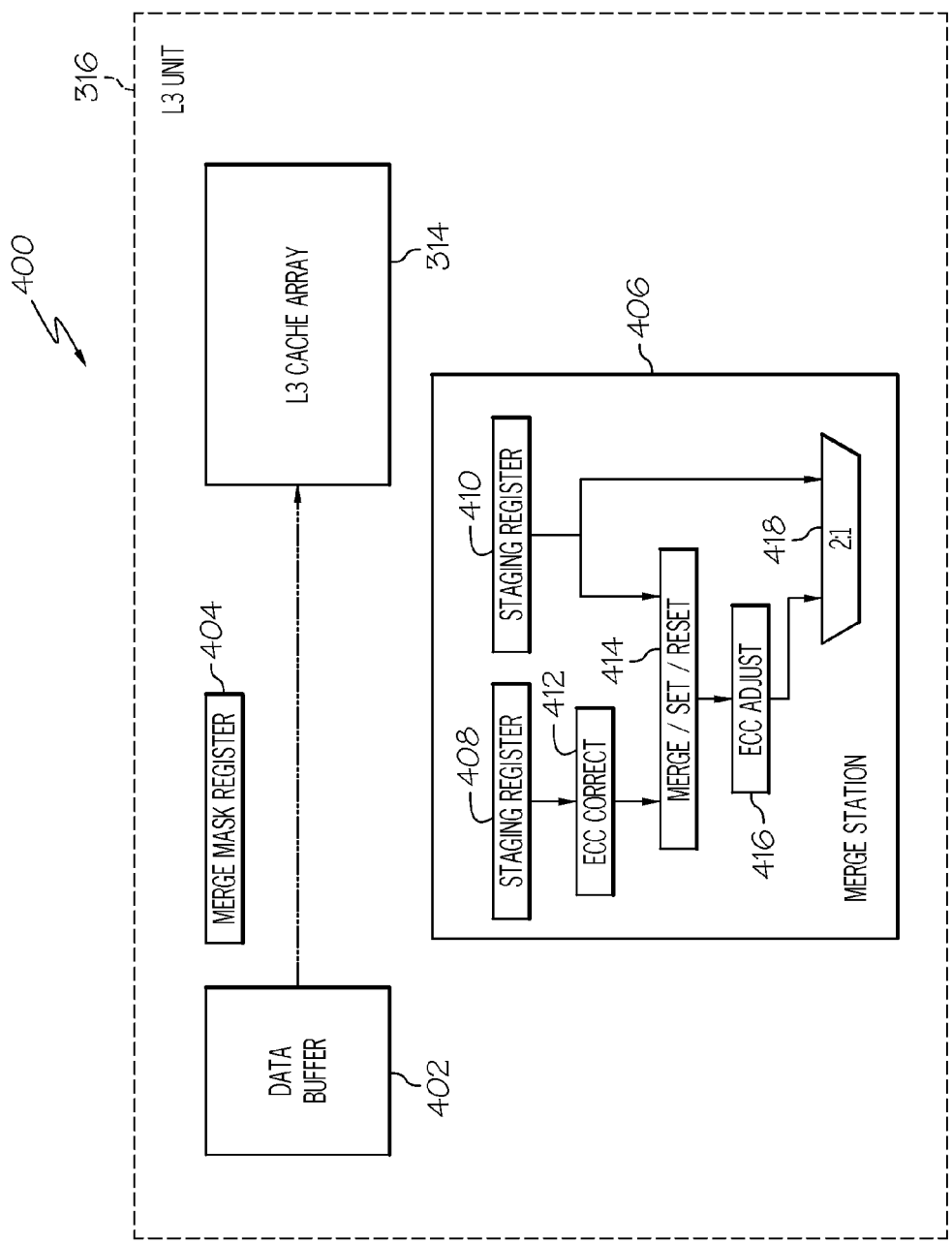

Once the merging process has completed, the ECC protection bits are then adjusted via the ECC adjustment module 416 to account for changes made to the newly merged data. The newly merged doubleword 506 is then fed, via MUX 418, to the data buffer 402 and written back to the first position of the data buffer 402. The cache controller 316 then writes the merged data 506 into the original cache location in the L3 cache 314, as shown in FIG. 6.

It should be noted that when a store controller (not shown), such as a CSAR, determines that a byte store command has been received a merge is to be performed, the store controller notifies a merge controller (not shown), such as a merge store address register. The merge controller obtains access to the merge station 406 to perform the merging process discussed below. Therefore, another advantage of various embodiments of the present invention is that the store controller protects the address of the merge controller. For example, the store controller protects the coherency of the line being used for the byte store operation that involves the merge. The store controller protects the address of that line by blocking any other requests until the merge controller is finished completing the merge and the new merged data is written back to the L3 cache 314.

As can be seen from the above discussion, a merge station generally utilized for I/O data merging is used to perform recovery store data merging. This allows a processing core to merge small packets of data with good background data in the L3 cache 314 when the background data in the core's cache (e.g., L2 cache) is corrected, thereby preventing unnecessary core checkstops. The merge vector sent by a processing core in addition indicates whether each portion of data in the L3 cache line should be preserved or overwritten by the store data from the core. Merging the data from the processing core with the good background data in the L3 cache 314 allows the processing core to finish storing out its data and prevents a core checkstop recovery action.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Figure 7:
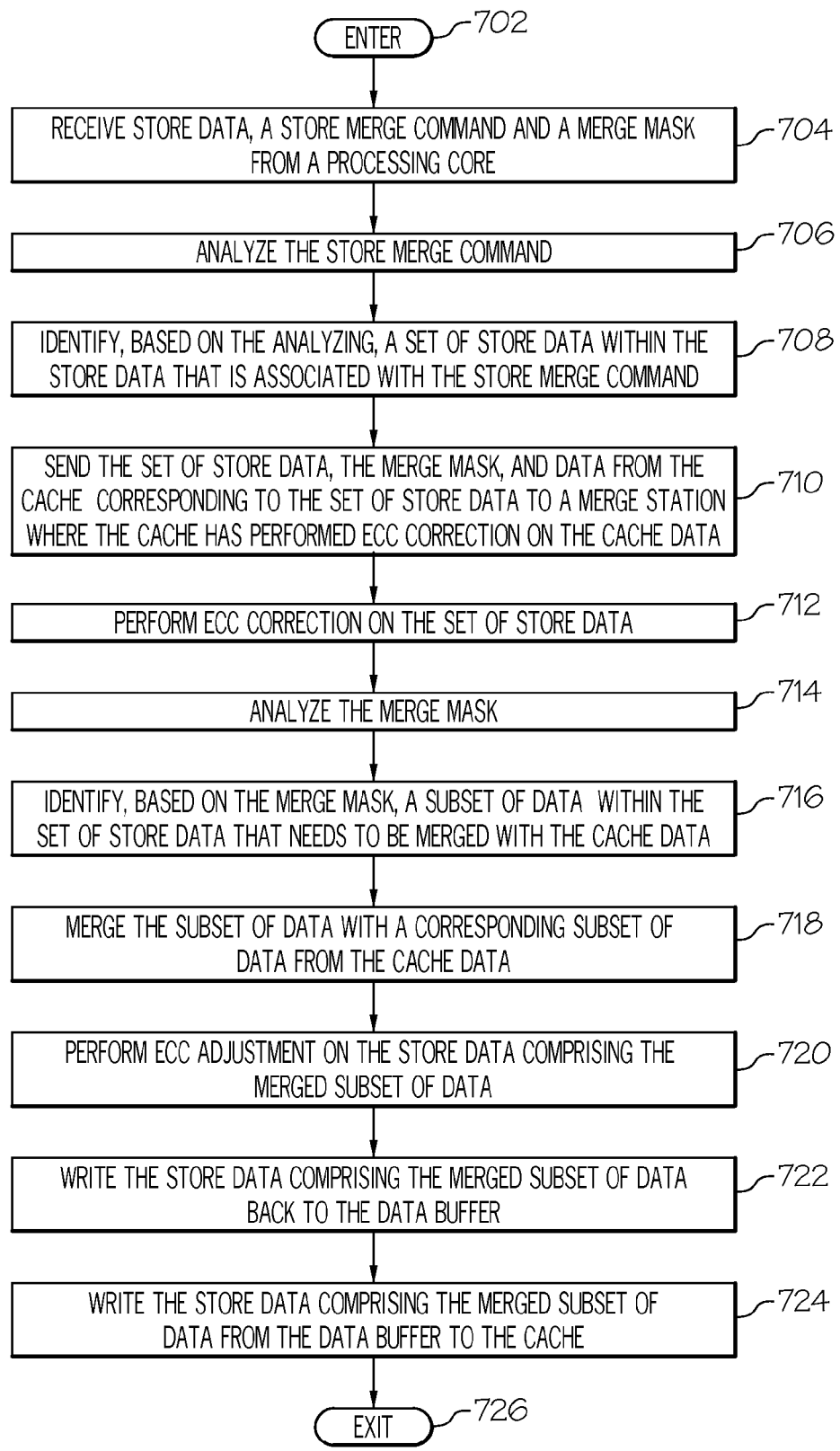
FIG. 7 is an operational flow diagram illustrating one example of a process for merging store data according to one embodiment of the present invention.

Referring now to FIG. 7, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 7 is operational flow diagram illustrating one example of performing recover store data merging in a cache memory. The operational flow diagram of FIG. 7 begins at step 702 and flows directly to step 704. The cache controller 316, at step 704, receives store data 502, a store merge command, and a merge mask 422 from a processing core 302. The cache controller 316, at step 706, analyzes the store merge command. The cache controller 316, at step 708, identifies, based on the identifying, a set of store data (e.g., an 8 byte cluster) within the store data 502 that is associated with the store merge command, as discussed above with respect to FIGS. 4-6. The cache controller 316, at step 710, sends the set of store data, the merge mask 504, and data 504 from the L3 cache 314 that corresponds to the set of store data to the merge station 406. In one embodiment, cache performs ECC correction on the data 504 prior to being sent to the merge station 406.

The merge station 406, at step 712, performs ECC correction on the set of store data. The merge station 406, at step 714, analyzes the merge mask 422. The merge station 406, at step 716, identifies, based on the merge mask 422, a subset of data within the set of store data that needs to be merged with the cache data 504, as discussed above with respect to FIGS. 4-6. The merge station 406, at step 718, merges the subset of data with a corresponding subset of data from the cache data 504. The merge station 406, at step 720, performs ECC adjustment on the newly formed store data 506 comprising the merged subset of data. The merge station 406, at step 722, writes the newly formed store data 506 back to the data buffer 402. The cache controller 316, at step 724, writes the newly formed store data 506 from the data buffer 402 to the L3 cache 314. The control flow then exits at step 726.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for merging data in a cache memory, the method comprising:
   receiving a set of store data from a processing core;
   receiving a store merge command and a merge mask from the processing core;
   identifying, based on the store merge command, a portion of the store data to perform a merging operation thereon;
   identifying, based on the merge mask, a first sub-portion of the portion of the store data comprising corrupted data, and a second sub-portion comprising uncorrupted data;
   selecting the second sub-portion comprising uncorrupted data to be merged with a corresponding set of data from a cache memory; and
   merging, based on the selecting, the second sub-portion with the corresponding set of data from the cache memory.

2. The method of claim 1, wherein the cache memory is an embedded dynamic random access memory (EDRAM) cache, and wherein the set of store data comprises a definable number of bytes.

3. The method of claim 2, wherein identifying a portion of the store data to perform a merging operation thereon further comprises:
   identifying, based on the store merge command, a set of bytes within the definable number of bytes.

4. The method of claim 3, wherein identifying the second sub-portion of the portion of the store data further comprises:
   identifying, based on the merge mask, a subset of bytes within the set of bytes.

5. The method of claim 1, wherein the cache memory is an embedded dynamic random access memory (EDRAM) cache, and further comprising:
   storing the set of store data in a data buffer; and
   storing the merge mask in a merge mask register.

6. The method of claim 1, wherein the cache memory is an embedded dynamic random access memory (EDRAM) cache, and further comprising:
   writing the portion of the store data comprising the second sub-portion that has been merged with the corresponding set of data from the cache memory to a data buffer prior to writing to the cache memory.

7. The method of claim 1, wherein the cache memory is an embedded dynamic random access memory (EDRAM) cache, and further comprising:
   writing the portion of the store data comprising the second sub-portion that has been merged with the corresponding set of data from the cache memory to a data buffer.

8. The method of claim 1, wherein the cache memory is an embedded dynamic random access memory (EDRAM) cache, and further comprising:
   performing an error control coding operation on the portion of the store data prior to performing the merging.

9. The method of claim 8, wherein the cache memory is an embedded dynamic random access memory (EDRAM) cache, and further comprising:

adjusting the error control coding operation after the merging has been performed.

10. The method of claim 1, wherein the cache memory is an embedded dynamic random access memory (EDRAM) cache, and further comprising:
performing an error control coding operation on the corresponding set of data from the cache memory prior to performing the merging.

11. An information processing device for merging data in a cache memory, the information processing device comprising:
a plurality of processing cores;
at least one memory cache communicatively coupled to the plurality of processing cores; and
at least one cache controller communicatively coupled to the at least one memory cache and the plurality of processing cores, wherein the at least one cache controller is configured to perform a method comprising:
receiving a set of store data from at least one processing core in the plurality of processing cores;
receiving a store merge command and a merge mask from the processing core;
identifying, based on the store merge command, a portion of the store data to perform a merging operation thereon;
identifying, based on the merge mask, a first sub-portion of the portion of the store data comprising corrupted data, and a second sub-portion comprising uncorrupted data to be merged with a corresponding set of data from a cache memory; and
merging, based on the selecting, the second the sub-portion with the corresponding set of data from the cache memory.

12. The information processing device of claim 11, wherein the cache memory is an embedded dynamic random access memory (EDRAM) cache, and wherein the set of store data comprises a definable number of bytes, and wherein identifying a portion of the store data to perform a merging operation thereon further comprises:
identifying, based on the store merge command, a set of bytes within the definable number of bytes.

13. The information processing device of claim 12, wherein identifying the second sub-portion of the portion of the store data further comprises:
identifying, based on the merge mask, a subset of bytes within the set of bytes.

14. The information processing device of claim 11, wherein the cache memory is an embedded dynamic random access memory (EDRAM) cache, and the method further comprising:
storing the set of store data in a data buffer; and
storing the merge mask in a merge mask register.

15. The information processing device of claim 11, wherein the cache memory is an embedded dynamic random access memory (EDRAM) cache, and the method further comprising:

writing the portion of the store data comprising the second sub-portion that has been merged with the corresponding set of data from the cache memory to a data buffer prior to writing to the cache memory.

16. A tangible computer program product for merging data in a cache memory, the tangible computer program product comprising:
a non-transitory storage medium readable by a processing circuit and storing instructions for execution by the processing circuit for performing a method comprising:
receiving a set of store data from at least one processing core in the plurality of processing cores;
receiving a store merge command and a merge mask from the processing core;
identifying, based on the store merge command, a portion of the store data to perform a merging operation thereon;
identifying, based on the merge mask, a first sub-portion of the portion of the store data comprising corrupted data, and a second sub-portion comprising uncorrupted data;
selecting the second sub-portion comprising uncorrupted data to be merged with a corresponding set of data from a cache memory; and
merging, based on the selecting, the second the sub-portion with the corresponding set of data from the cache memory.

17. The tangible computer program product of claim 16, wherein the cache memory is an embedded dynamic random access memory (EDRAM) cache, and wherein the set of store data comprises a definable number of bytes, and wherein identifying a portion of the store data to perform a merging operation thereon further comprises:
identifying, based on the store merge command, a set of bytes within the definable number of bytes.

18. The tangible computer program product of claim 17, wherein identifying the second sub-portion of the portion of the store data further comprises:
identifying, based on the merge mask, a subset of bytes within the set of bytes.

19. The tangible computer program product of claim 16, wherein the cache memory is an embedded dynamic random access memory (EDRAM) cache, and the method further comprising:
storing the set of store data in a data buffer; and
storing the merge mask in a merge mask register.

20. The tangible computer program product of claim 16, wherein the cache memory is an embedded dynamic random access memory (EDRAM) cache, and the method further comprising:
writing the portion of the store data comprising the second sub-portion that has been merged with the corresponding set of data from the cache memory to a data buffer prior to writing to the cache memory.

* * * * *